_United States Patent Office_ 3,065,582
Patented Nov. 27, 1962

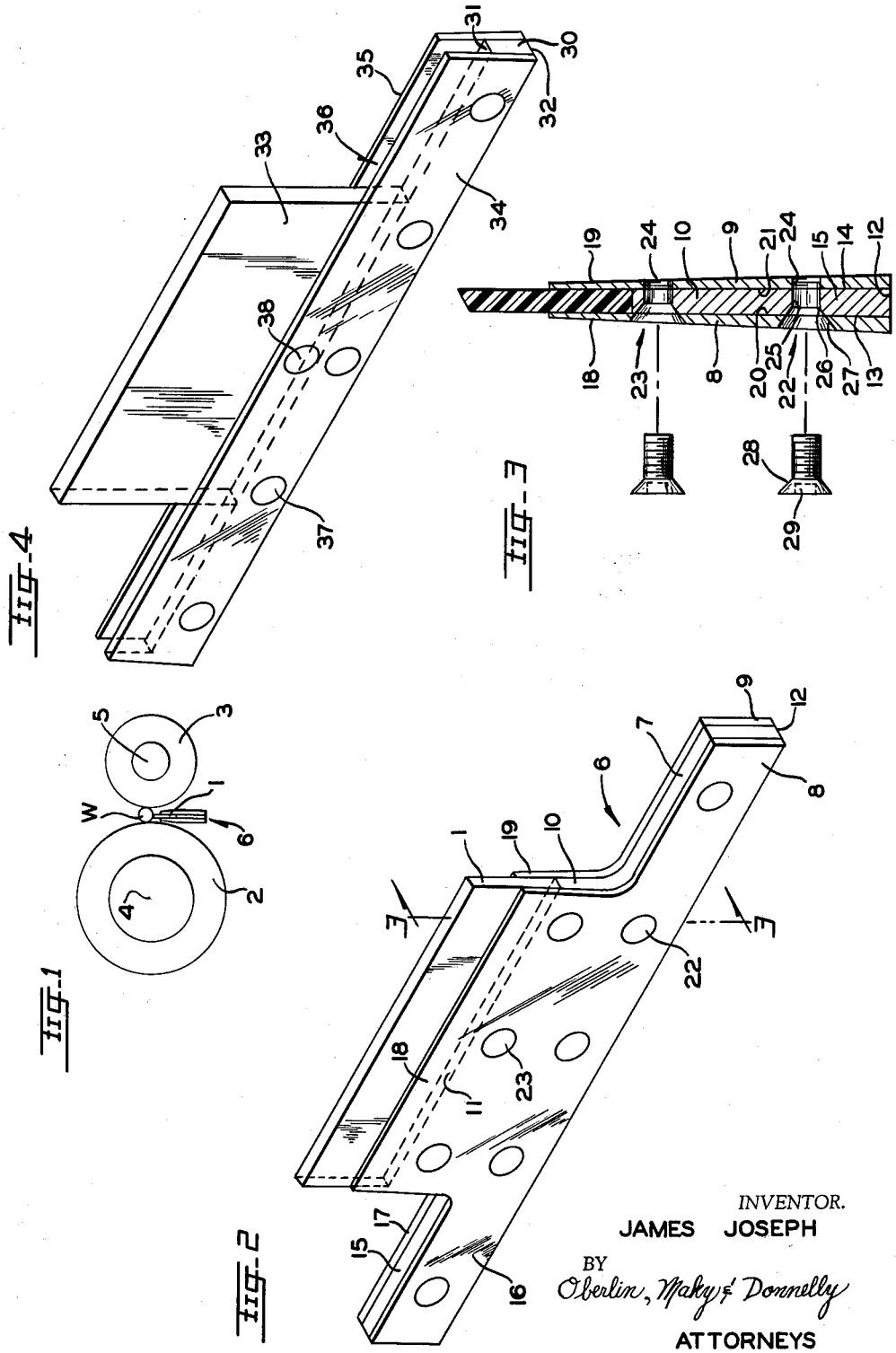

3,065,582
WORK SUPPORT FOR CENTERLESS GRINDER
James Joseph, Willoughby Hills, Ohio (Beach Road, R.R. Box 234, Sister Bay, Door County, Wis.)
Filed Sept. 17, 1959, Ser. No. 840,617
4 Claims. (Cl. 51—238)

This invention relates generally as indicated to a work support for centerless grinders and more particularly to a work blade holder for such grinders which will permit a much longer useful life for the work blade employed.

The three principal elements of a centerless grinding machine are the work rest, the grinding wheel and the regulating wheel. The above-mentioned elements may be arranged and combined in a number of different ways, but the fundamental principles of centerless grinding are the same in all cases. The action of the grinding wheel which is rotating downwardly past the work support generally forces the work against the work rest due to what is termed the cutting pressure. The grinding wheel also forces the work against the regulating wheel by virtue of what is termed the cutting contact pressure. These pressures, aided by the gravity force component of the work, keep the part being ground in continual moving contact with the work blade. The centers of the grinding wheel and the regulating wheel determine an axis of revolution and the rotation of the work as the result of the contra-rotation of the grinding wheel and regulating wheel generates a cylindrical surface on the work. If the center of the work is elevated above the centers of the wheels by raising the supporting work blade, a generally better "rounding-up" effect is obtained and consequently the work is usually supported above the centers of the grinding and regulating wheel. To obtain the maximum corrective round-up action, a generally angular top work blade is employed which is slightly off-set from the center of the area between the grinding and regulating wheels. The angles of the work, with respect to the wheels and blade, as well as the vertical height of the work, must be closely regulated and accordingly a work blade support which will provide a means readily to space the work center as high as possible with respect to the wheels would be highly desirable. Usually, however, such work supports have necessarily been of rather thin construction to avoid contact with the large rapidly rotating wheels and consequently vibrations occur in the blade as the work is rotated thereon which produce chatter marks on the work and accordingly decrease the quality of the work performed.

Moreover, when work blades become worn, they generally must be thrown away, since they cannot readily be shimmed up in such a manner as firmly to hold the blade to prevent the aforementioned chatter. Moreover, a common method of securing work blades within a work holder is by means of rivets, thus precluding any subsequent adjustments of the blade with respect thereto.

It is accordingly a principal object of my invention to provide a work support for centerless grinders that will firmly and rigidly hold a work blade to prevent the undesirable vibrations which produce chatter marks on the work.

It is a further principal object of my invention to provide a work blade holder for centerless grinders in which the work blades may be shimmed up after they become worn to enable the blades to be used over a longer and more useful period.

It is yet another object of my invention to provide a work support for centerless grinders that can accommodate work blades of varying thicknesses and lengths.

It is still another object of my invention to provide a work support for centerless grinders which can be made readily from few parts which can easily be replaced thus producing a work support at much lower cost.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

In said annexed drawing:

FIG. 1 is a schematic elevation of a centerless grinding machine with a work support built in accordance with my invention employed therein;

FIG. 2 is a perspective view of one form of my invention;

FIG. 3 is an enlarged vertical sectional view taken on the line 3—3 of FIG. 2; and FIG. 4 is a perspective view of another embodiment of my invention.

Referring now more particularly to FIG. 1, there is illustrated a conventional centerless grinding apparatus with the three principal elements being the work blade 1, the grinding wheel 2 and the regulating wheel 3. The work W is supported on the blade 1 above the centers 4 and 5 of the grinding and regulating wheels respectively. The work blade 1 is supported on my work support generally shown at 6 which is in turn usually mounted in a tongue slot or the like on the base of the machine.

Referring now to FIG. 2, it will be seen that my work support comprises three basic parts: a center supporting bar 7; and side clamping plates 8 and 9. The center supporting bar has an upstanding central portion generally shown at 10, the top edge 11 of which forms a platform which is designed to support the bottom edge of the work blade 1. The center supporting bar is slightly tapered toward the top edge or platform 11 so that the base portion generally shown at 12 is considerably wider than the top edge or platform 11. As an example of such taper, the base may be a full ¼ of an inch wide whereas the top platform 11 may be only 3/16 of an inch wide. The sides 13 and 14 of the center supporting bar are completely planar so that such taper will be uniform throughout the entire longitudinal length of my work support. It will now be seen that my center supporting bar has an elongated base portion 15 and a center smaller upstanding portion forming generally an inverted T with a truncated stem.

My side clamping plate members 8 and 9 are essentially allochirally identical in form and likewise have elongated base portions 16 and 17 and upstanding center portions 18 and 19, respectively. Each of the clamping plates presents perfectly planar interior surfaces 20 and 21 which mate respectively with the surfaces or sides 13 and 14 of my center supporting bar. It will now be seen that when the clamping plates are firmly secured to the sides of the center supporting bar, there will be formed a deep dove-tailed longitudinal groove in the center upstanding portion of my work support.

In order firmly to secure the parts 7, 8 and 9 of my work support together, I provide the elongated base portions of each of such members with horizontally aligned apertures 22, these being five in number in the illustrated FIG. 2 embodiment. I further place in the upstanding central portion, three additional apertures 23, each of the members in this manner having a total of eight aligned apertures in the illustrated FIG. 2 embodiment.

The configuration of these apertures in each of the respective parts may be more clearly seen in FIG. 3. Only the apertures in clamping plate 9 are threaded, such apertures being threaded as shown at 24. The apertures in the member 7 comprise a nonthreaded cylindrical portion 25 and a counter-sunk or tapered portion 26. The aperture in the member 8 constitutes merely a continuation 27 of the counter-sunk or tapered portion 26 of the aperture in the center member 7. Within each of the series of apertures 22 and 23, I utilize suitable fastening means as, for example, flat headed screws 28. These screws have conically shaped heads which closely conform to the flaring openings formed by the portions 26 and 27 in the apertures in the parts 7 and 8 respectively. In this manner, it will be seen that the parts 7, 8 and 9 may be rigidly firmly secured together by a plurality of such fastening members 28. The screws I employ may, for example, have recessed heads 29 in order to be rotated by the insertion therein of a tool such as an Allen wrench.

The particular spacing and number of my fastening elements 28 provides a work blade clamping device which will assure uniform longitudinal pressure on the blade 1 as well as preclude the possibility of any undue vibrations being set-up as a result of the work rotating rapidly on the beveled top of the work blade 1.

My work supporting device illustrated in FIGS. 2 and 3 is especially adapted for use with fiber or plastic resin type work support blades which are generally thinner and consequently more flexible than sintered carbide or other carboloid type of conventional metal work blades. Consequently, the fiber blades are more subject to vibration and need the elongated side clamping plate devices firmly to secure them against vibrations which produce the aforementioned deleterious chattering effects.

With my work supporting device, it is, of course, possible to employ both metal and fiber or plastic work blades in as much as my work support device will accommodate blades of varying longitudinal and transverse dimensions. When the fastening screws are firmly affixed through the apertures in the threaded portion of one of the clamping plates, the upstanding center portions 18 and 19, being relatively thinner than the elongated base portions, such upstanding sides will generally flex to conform to a work blade having a slightly larger transverse dimension. My blade supporting device will nevertheless firmly hold the work blade on the top seat 11 of my center bar support 7 as a result of the clamping action of the upstanding portions 18 and 19 which is produced by the tapered configuration of the center bar support 7.

Referring now to FIG. 4, I have illustrated another embodiment of my invention which can be employed firmly to hold work support blades of the aforementioned sintered carbide, carboloid or hardened metal class. The work support is generally similar to that shown in FIGS. 2 and 3 in that it comprises three easily manufactured and thus replaceable parts. A center work support bar 30 is employed providing an elongated top seat 31. Again, the work supporting bar 30 is slightly tapered toward such seat so that the base 32 is slightly wider than the seat 31. The work blade 33 rests on the seat 31 and is clamped in position thereon by two side clamping plates 34 and 35 which again extend slightly above the center bar 30 to provide an elongated slightly dove-tailed groove 36. In a manner similar to the construction shown in FIGS. 2 and 3, I provide five fasteners 37 in the longitudinal base portion extending through the three members 34, 30 and 35. These fasteners are secured in the same manner as those shown in FIGS. 2 and 3. In order more firmly to rigidify my clamping member and further to preclude the blade from moving longitudinally within the blade clamp, I provide a sixth fastener 38 which will extend through the upstanding portions of the plates 34 and 35 and through a suitable aperture in the blade 33. This sixth fastener will, of course, further rigidify the mounting for the work blade. Again, the number and spacing of the fastening members together with the clamping effect obtained by the tapering of the center member 30 will firmly secure the blade 33 to support the work W between the grinding and regulating wheels.

I prefer to use flat-head screws of the type shown in that the sides of my work support device may then easily be handled and readily be positioned in the aforementioned tongue slot in the base of the centerless grinding machine. Further, if desired, the tips of the fasteners or screws may be ground off so that both exterior sides of the clamping plates will present generally planar surfaces.

It can now be seen that my work support is made from there easily produced parts which can readily be replaced. Moreover, my holders can accommodate work blades of any length and of substantial variation in width and height. It this manner, when the metallic blade 33 becomes worn and it is impractical further to shim up such blade to obtain the aforementioned highly desirable high position above the centers of the grinding and regulating wheels, such blade can then be placed in my work support shown in FIGS. 2 and 3 and accordingly serve for a much longer useful life. It will be noted that even as such blade wears further, it can be again shimmed up for still futher use.

Moreover, with my unique clamping action, permanent fasteners need not be employed to secure the blade therein and yet the fasteners still produce the required rigidity to preclude the vibrations resulting in the undesired chatter marks on the work piece. Further, the clean outline and configuration of my work support makes it readily movable on centerless grinding machines to be easily adjusted accurately to position the work between the rotating wheels.

Other modes of applying the principle of the invention may be employed, change being made as regards the details described, provided the features stated in any of the following claims or the equivalent of such be employed.

I therefore, particularly point out and distinctly claim as my invention:

1. A work support for centerless grinders comprising a supporting bar having an upstanding center portion, said supporting bar being tapered toward the top of said upstanding center portion and having planar sides, side clamping plates for said supporting bar having upstanding center portions extending beyond said upstanding center portion of said supporting bar and firmly clamping a work blade therebetween on the top of the upstanding center portion of said supporting bar, and fastening means extending through said side clamping plates and said supporting bar adapted firmly to clamp said clamping plates against the sides of said supporting bar, there being a plurality of said fastening means spaced throughout the length of said clamping plates and said center supporting bar to preclude vibrations being set up in said work blade clamped therein, said side clamping plates being thinner at the tops of their upstanding center portions, and said fastening means comprising screws extending through tapered openings in one side clamping plate, a tapered opening in the center supporting bar and a threaded opening in the other side clamping plate.

2. A work support for centerless grinders and the like comprising an elongated wedge-shaped center bar, side clamping plates for said wedge-shaped center bar extending above said center bar, a work blade supported on said center bar firmly clamped between said side clamping plates, and a plurality of fastening means extending throughout the length of said center bar and side clamping plates firmly to secure a work blade to said work support, one side clamping plate having spaced apertures therein and said center bar having tapered apertures therein aligned with the apertures in said side clamping plate, and the other clamping plate having threaded apertures therein aligned with the apertures in said one side clamping plate and center bar whereby said work support may firmly be held together by screws secured in said apertures.

3. A work support for centerless grinders comprising a supporting bar having an upstanding center portion having a flat top surface, said supporting bar being tapered toward said top surface of said upstanding center portion and having planar sides, side clamping plates for said supporting bar having upstanding center portions extending beyond said upstanding center portion of said supporting bar, and a plurality of fastening means extending throughout the length of said supporting bar and side clamping plates firmly to secure a work blade clamped therebetween on said top surface of the upstanding center portion of said supporting bar, one side clamping plate having spaced apertures therein and said supporting bar having spaced apertures therein aligned with the apertures in said one side clamping plate, and the other side clamping plate having threaded apertures therein aligned with the apertures in said one side clamping plate and supporting bar whereby said work support may firmly be held together by screws secured in said aligned apertures.

4. A work support as set forth in claim 3 wherein said side clamping plates are thinner at the tops of their upstanding center portions.

References Cited in the file of this patent

UNITED STATES PATENTS

| | | |
|---|---|---|
| 809,690 | Hunt | Jan. 9, 1906 |
| 1,575,520 | Archea | Mar. 2, 1926 |
| 1,585,984 | Heim | May 25, 1926 |
| 1,688,103 | Archea | Oct. 16, 1928 |
| 1,758,649 | Chapman | May 13, 1930 |
| 2,464,246 | Herbster | Mar. 15, 1949 |